July 20, 1965 W. R. SCHILKE 3,196,049
RESERVE TYPE BATTERY
Filed June 1, 1961 2 Sheets-Sheet 1

INVENTOR.
Warren R. Schilke
BY
ATTORNEY

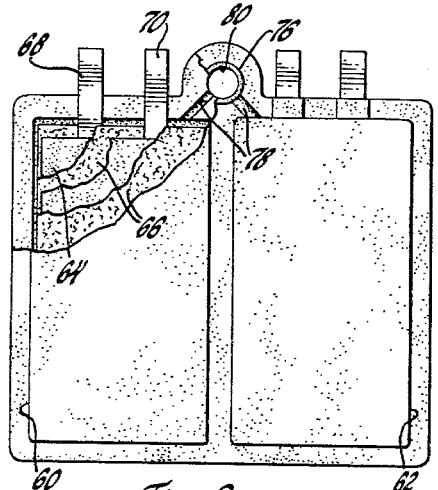
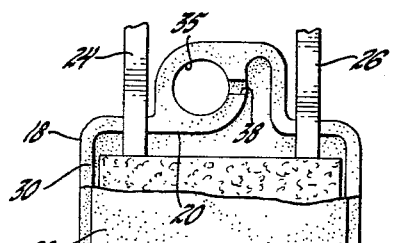
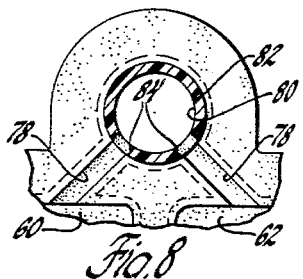
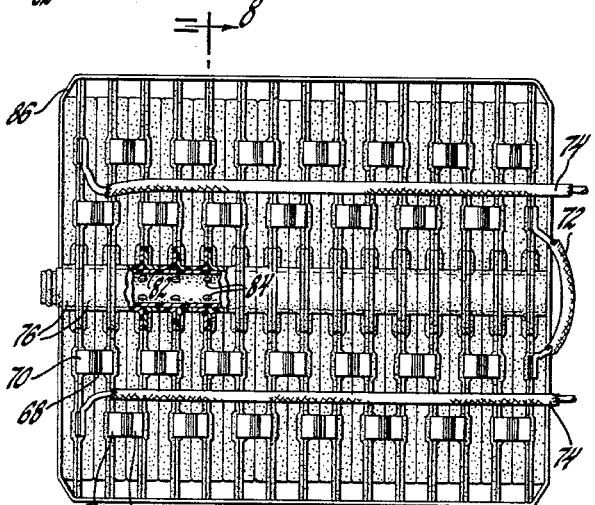
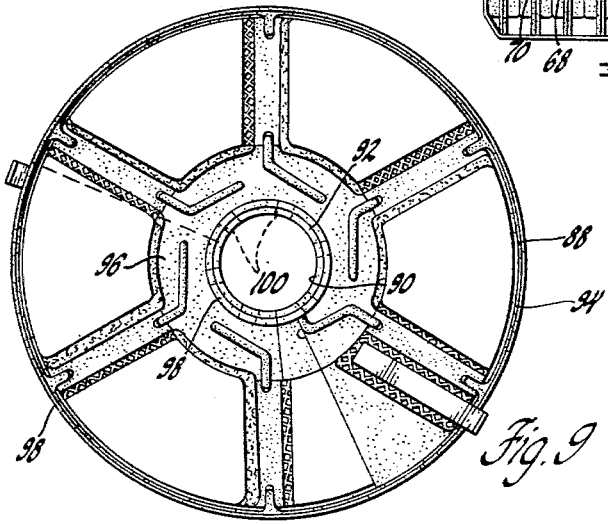
INVENTOR.
Warren R. Schilke

United States Patent Office 3,196,049
Patented July 20, 1965

3,196,049
RESERVE TYPE BATTERY
Warren R. Schilke, Anderson, Ind., assignor to General Motors Corporation, Detroit, Mich., a corporation of Delaware
Filed June 1, 1961, Ser. No. 114,140
2 Claims. (Cl. 136—90)

This invention relates to a reserve-type battery and more particularly to a reserve-type silver oxide-zinc battry, which is activated by placing the electrodes of the battery in contact with an electrolyte.

A reserve-type battery is one which is stored without electrolyte in contact with the battery plates. The battery is, thus, inactive when stored and activated by placing the electrolyte in contact with the battery plates. At present, reserve-type silver oxide-zinc batteries are of considerable importance as electrical power sources in missiles. For missile applications, a plurality of individual voltaic cells must be combined in a single battery to obtain the required power output. Moreover, for missile applications the batteries must be relatively instantaneously activated.

Since the life of the individual battery cells at the rate of desired discharge is quite small and since the individual cells become active within a matter of seconds, it is important that all of the individual cells of the battery be activated concurrently. Accordingly, means are provided for concurrently activating all the cells of the battery. Prior battery constructions involved a manifold that was a separately formed item which had to be secured to each cell in a plurality of manufacturing steps. More importantly, however, such constructions added to the weight and bulk of the battery assembly, an especially objectionable factor for missile batteries.

It is an object of the invention to provide a new electrochemical cell construction which can be used to form a reserve-type battery having an integral manifold.

Other objects, features and advantages of the present invention will become more apparent from the following description of preferred embodiments thereof and from the drawings, in which:

FIGURE 1 diagrammatically shows the essential elements of a remotely activated battery;

FIGURE 2 shows in perspective and in partial section, a battery assembly which is formed in accordance with the invention;

FIGURE 3 contains a transverse sectional view through a battery which has been formed using a cell construction of the invention;

FIGURE 4 illustrates in perspective with parts broken away, the cell construction used to form the battery assembly shown in FIGURE 2;

FIGURE 5 contains a view in partial section of the cell structure shown in FIGURE 2;

FIGURE 6 shows an elevational view with parts broken away of a further modification of the invention;

FIGURE 7 shows a plan view of an assembly of cells such as shown in FIGURE 6;

FIGURE 8 shows an enlarged fragmentary view along the line 8—8 of FIGURE 7; and

FIGURE 9 shows a plan view of still another modification of the invention.

Briefly, the invention involves a lightweight voltaic cell enclosure, an integral part of which includes a segment of a manifold that communicates with plates disposed in the cell enclosure. Accordingly, the invention also involves a battery having a segmented manifold, each segment of which is an integral part of the individual cell enclosures comprising the battery. Aligned cell enclosures form a closed system into which a cell activator, such as an electrolyte, can be introduced to concurrently activate all the cells in the battery.

Figure 1:
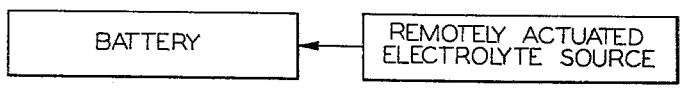
Figure 2:
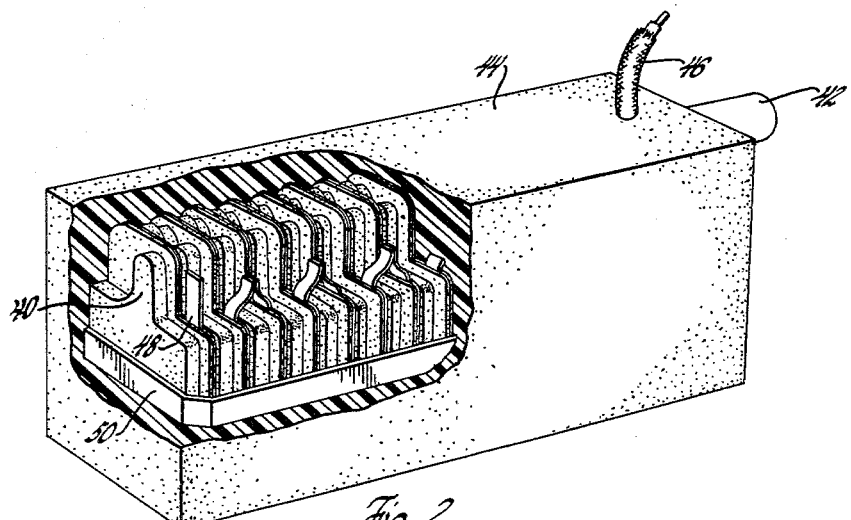
Figure 3:
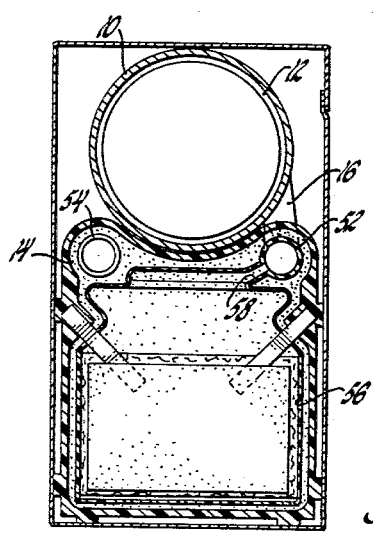

The present invention is particularly useful in remotely-activated silver oxide-zinc batteries for missile applications. Referring now to FIGURES 1, 2 and 3, a missile battery not only includes a plurality of individual cells, but also includes means for activating the cells by remote control. A silver oxide-zinc reserve-type battery is activated by injecting an aqueous solution containing about 15% to 30% potassium hydroxide into the battery cells. The potassium hydroxide solution is contained in a reservoir within the battery case. As shown in FIGURE 3, the reservoir can be a cylinder 10 within which a cylindrical piston 12 is disposed to induce electrolyte flow from the reservoir into the manifold for concurrent distribution to each of the cells of the battery.

The construction of the reservoir, the means for communicating it with the manifold, and the specific means by which the electrolyte is induced to flow from the reservoir into the manifold form no part of this invention and any of the known and accepted teachings can be used. However, by way of example, the cylindrical reservoir 10 shown in FIGURE 3 can be used. A piston 12 is urged against the electrolyte in the reservoir by expanding gases from a remotely fired squib (not shown) which is appropriately located in the cylinder. The electrolyte flows from the reservoir to the cells 14 of the battery through a tube 16 which is appropriately connected to the last cell enclosure in the aligned series.

The connection between the last cell enclosure and the conduit can be accomplished in any suitable manner, depending upon the nature of the materials used. If all the relevant parts are metal, the connection can be secured by soldering, threaded fittings or the like. If all the relevant parts are plastic, the connections can be secured by solvent bonding techniques, adhesives, or suitable mechanical connections, included threaded fittings, clamps, etc.

Figure 4:
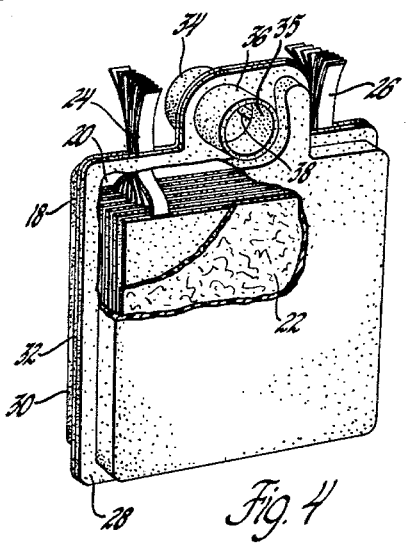

FIGURES 4 and 5 show a preferred cell construction, while FIGURE 2 shows an assembly of these cells. The cell construction shown includes an enclosure 18 which has a chamber 20 therein for containing a plurality of alternately disposed positive battery plates and negative battery plates, e.g., silver oxide battery plates and zinc battery plates. The adjacent plates are spaced from one another by means of suitable porous separators 22, such as porous paper. Cell plate terminal leads 24 extending from each silver oxide plate in the chamber are bonded together by cold welding, soldering or the like to form a parallel electrical connection therebetween. Analogously, each of the zinc plate terminals 26 are joined together by cold welding, soldering or the like to form a parallel connection therebetween. Both the size and the number of the cell plates involved will determine the appropriate dimensions for the enclosure 18 and plate chamber 20.

The cell receptacle shown in FIGURES 2, 4 and 5 is preferably formed in two halves 28 and 30, joined together at a longitudinal seam 32 to form the complete enclosure. If metal, the two halves can be joined by soldering, welding or the like or if plastic, by solvent bonding techniques or adhesives.

The upper part of the cell enclosure 18 forms a segment of an electrolyte manifold. A short tubular projection 34 and 36 on each side of the enclosure surrounds an opening 35 therein forming a cylindrical conduit through the enclosure. The cylindrical conduit communicates with the plate chamber by means of a short passage 38 therebetween.

The tubes 34 and 36 on opposite sides of the cell enclosures are preferably of different diameters to permit interlocking, or nesting, as shown in FIGURE 2.

The interlocking effect is obtained by making the outer diameter of the tube 34 on one side of the receptacle substantially the same dimension as the inner diameter of the tube 36 on the opposite side of the receptacle. In this manner an aligned assembly of similar receptacles can be press fitted together and then sealed by solvent or adhesive bonding techniques to present a substantially leak-proof manifold.

FIGURE 2 also shows that there is no opening in the outside wall of the last cell enclosure 40 in an aligned assembly, opposite the end to which the reservoir is attached, via a tube 42. Should venting of the cells to the atmosphere be desired, it can be accomplished by an appropriate connection to the conduit 42. It can also be done by employing a port on the last cell 40 in the series and making appropriate connections thereto. The specific venting arrangement used is, thus, variable and any accepted means would be satisfactory.

The entire assembly is preferably bonded together, as at 50, and then secured by casting a suitable plastic as a solid block 44 around the bonded assembly. A terminal lead 46 extends from the block 44. Another terminal lead (not shown) is attached to the terminal 48 of the end cell 40 and similarly extends through the block.

The nature of the material used for the cell enclosure is governed to a considerable extent by the reactivity of that material with the cell electrolyte. Moreover, if the cell enclosure is formed of a conductive material, provision must be made to suitably insulate it. Plastic is a relatively inert non-conductor and for this reason it is preferred, in most instances, to use plastic to form the cell enclosure. Polyethylene can be used to form relatively thin-walled structures which are readily vacuum formed in two parts and subsequently heat sealed together. However, for missile applications an extremely high degree of care must be taken to insure maximum strength of the cell receptacle and, for this reason, polystyrene is preferred. Polystyrene not only has high strength but can be injection molded and readily bonds to itself by solvent techniques.

Another modification of the invention is shown in FIGURE 3. This cell enclosure includes not only a segment for a manifold 52 but also a segment of a vent tube 54, each of which are formed in generally the same manner as in the preceding modification of the invention. The manifold 52 communicates with the battery plate chamber 56 by means of an interconnecting passage 58. Electrolyte in the reservoir 10 passes to the manifold 52 through the conduit 16 and into the cell chamber 56 through the passage 58.

The manifold is connected to the vent tube by means of a cross-over passage (not shown). In this manner the electrolyte injecting manifold 52 also serves as a vent manifold. Gases generated during discharge of the battery pass into the manifold 52 and into the vent tube 54 through the cross-over passage. They are vented to the outside from the vent tube. In this manner the vented gases have a greater chance to deposit entrained liquids and vapors before they are vented than if the vent tube 54 were directly connected to each of the cell chambers as a manifold. A special liquid trap (not shown) can be provided at the open end of the vent tube, if desired, depending on the nature of the application for which the battery is intended.

Still another embodiment of the invention is shown in FIGURES 6, 7 and 8. In this embodiment the cell enclosure is formed so as to have two laterally disposed chambers 60 and 62 for containing plates 64 to separate cells. This construction facilitates the formation of an extremely compact high voltage battery.

As in the previous modification of the invention, each chamber in the cell enclosure contains a plurality of alternately disposed positive and negative battery plates, e.g., silver oxide battery plates and zinc battery plates. Adjacent plates are spaced from one another by means of porous separators 66, such as porous paper. As in the preceding modifications of the invention all terminal leads 68 of the positive electrodes in a chamber are joined together in parallel fashion to form a single terminal extending from the cell enclosure. All of the negative terminal leads 70 are analogously joined. In an assembly of aligned cell enclosures, as shown in FIGURE 7, the negative terminal 70 of each cell is connected to the positive terminal 68 of the next succeeding cell. Correspondingly, the positive terminal 68 of that cell is attached to the negative terminal of the next preceding cell. Thus, the exterior connection between the individual cells is accomplished in the normal and accepted series manner.

A cross-over terminal connection 72 is made between positive and negative leads from each row of cells at the end of the row. Suitable electrical conductors 74 are secured to the cells at the opposite end of the rows to draw power from the battery.

The manifold construction in this embodiment differs somewhat from that in the preceding embodiments. As in the previous embodiments, tubular projections 76 on each side of the enclosure form a segment of a manifold. However, in this modification of the invention the tubes 76 forming the manifold are all of the same inner and outer diameter so that a series of aligned receptacles registers all of the tubes of the aligned receptacles. Thus, when aligned, the ends of the tubes abut one another, instead of interlocking. Passages 78 from each electrode chamber 60 and 62 communicate with the interior 80 tubes of each enclosure.

A tube 82 having perforations 84 therein is disposed within the manifold formed by the registered tubes. The perforations 84 in the tube correspond to the passages 78 leading to the respective cell chambers providing communication between the interior of the tube and the cell chambers for delivery of electrolyte.

The entire assembly is secured by a metal band 86 and a suitable plastic (not shown) is cast around the assembly to both seal it and also impart additional strength thereto.

The embodiment of the invention shown in FIGURE 9 illustrates that the invention need not assume a construction in which each cell enclosure is a completely closed container. This type of enclosure is more fully described in my copending United States patent application Serial No. 114,141, entitled "Battery," which was filed concurrently herewith and which is also assigned to the assignee of the present invention. This last-mentioned modification of the invention involves a battery having a plurality of axially aligned annular cell receptacles 88 which, in effect, form a tubular battery having an axially disposed manifold 90 therein.

Each unit forms an inner 92 and outer wall 94 for the enclosure, as well as a common wall 96 between adjacent cell chambers. The outer edge 98 of each wall is relieved to mate with a relieved area on the inner edge of the walls of the next adjacent unit. Thus, an interlocking of the units is attained. Ports 100 extending through the inner wall provide communication between the cell chamber and the manifold.

Although the invention has been described in connection with certain specific examples thereof, no limitation is intended thereby except as defined by the appended claims.

I claim:

1. A battery comprising at least two aligned electrochemical cell enclosures, each of said enclosures having at least one chamber for holding cell plates, each of said enclosures having at least one mutually corresponding opening therein for introducing an electrolyte into the enclosures, a tubular projection on each of said enclosures surrounding the opening therein, the projections of adjacent cell enclosures nesting within one another in a close fitting relationship to provide an imperforate passage between the enclosures, and means for communicating said passage with the cell chamber of each of said enclosures.

2. The battery as defined by claim 1 wherein the means for communicating the passage with the cell chamber includes an antechamber in the enclosure.

References Cited by the Examiner

UNITED STATES PATENTS

| | | | |
|---|---|---|---|
| 340,474 | 4/86 | Armstrong | 136—162 |
| 2,636,059 | 4/53 | Garine | 136—30 |
| 2,677,713 | 5/54 | Weil et al. | 136—160 |
| 2,836,642 | 4/58 | Bauer | 136—90 |
| 2,847,494 | 8/58 | Jeannin | 136—90 |
| 2,905,741 | 9/59 | Smith | 136—90 |
| 2,945,078 | 7/60 | Chapman et al. | 136—20 |
| 2,963,533 | 12/60 | Gold et al. | 136—90 |
| 2,969,315 | 1/61 | Bacon | 204—284 |
| 2,981,778 | 4/61 | Freund | 136—90 |
| 2,985,702 | 5/61 | Darland et al. | 136—90 |
| 2,996,564 | 8/61 | Morton | 136—90 |

JOHN H. MACK, *Primary Examiner.*

JOHN R. SPECK, JOSEPH REBOLD, MURRAY TILLMAN, *Examiners.*